US012780575B2

(12) United States Patent
Frere et al.

(10) Patent No.: US 12,780,575 B2
(45) Date of Patent: Nov. 3, 2026

(54) TILTING DOOR SYSTEM WITH A DAMPING SYSTEM

(71) Applicant: Evolis SAS, Beaucouze (FR)

(72) Inventors: Maxence Frere, La Chapelle Saint Florent (FR); Jordan Poirier, Corné (FR)

(73) Assignee: Evolis SAS, Beaucouze (FR)

( * ) Notice: Subject to any disclaimer, the term of this patent is extended or adjusted under 35 U.S.C. 154(b) by 244 days.

(21) Appl. No.: 18/654,303

(22) Filed: May 3, 2024

(65) Prior Publication Data

US 2024/0367929 A1 Nov. 7, 2024

(30) Foreign Application Priority Data

May 5, 2023 (FR) ....................................... 2304507

(51) Int. Cl.

| | |
|---|---|
| ***B65H 1/04*** | (2006.01) |
| ***B65H 1/26*** | (2006.01) |
| ***E05D 5/10*** | (2006.01) |
| ***E05D 11/06*** | (2006.01) |

(52) U.S. Cl.

CPC ................ *B65H 1/26* (2013.01); *B65H 1/04* (2013.01); *E05D 5/10* (2013.01); *E05D 11/06* (2013.01); *B65H 2405/1134* (2013.01); *E05D 2005/106* (2013.01); *E05Y 2201/224* (2013.01)

(58) Field of Classification Search

CPC . B65H 1/04; B65H 1/266; B65H 1/26; B65H 2405/1134; B65H 2701/1914; B65H 2402/31; E05D 5/10; E05D 2005/106; E05D 11/06; G06K 13/14; G06K 13/0875; B41J 13/12

See application file for complete search history.

(56) References Cited

U.S. PATENT DOCUMENTS 4,157,853 A * 6/1979 Carey ..................... A24F 19/06 312/246
4,979,634 A * 12/1990 Begley ................... H01H 9/287 174/67

(Continued)

FOREIGN PATENT DOCUMENTS

EP 1017013 7/2000

OTHER PUBLICATIONS

"European Application Serial No. 24173945.7, Response filed Jan. 20, 2025 to Extended European Search Report mailed Sep. 9, 2024", 24 pages.

(Continued)

*Primary Examiner* — Luis A Gonzalez

(74) *Attorney, Agent, or Firm* — Schwegman Lundberg & Woessner, P.A.

(57) ABSTRACT

A door system for a processing machine, including a secondary frame having a stop, a door with a leaf and a shaft mounted movable in rotation about a tilting axis on the secondary frame between a closed position where the leaf extends vertically and an open position where the leaf extends horizontally and where, in the closed position, the shaft is in the lower portion of the leaf, and where the shaft has on its periphery, a protrusion, where in the closed position, the protrusion is not pressed against said stop and where, in the open position, the protrusion is pressed against said stop.

8 Claims, 4 Drawing Sheets

(56) References Cited

U.S. PATENT DOCUMENTS

| | | | | |
|---|---|---|---|---|
| 7,604,142 | B2 * | 10/2009 | Banik | A45D 40/221 220/829 |
| 2006/0102723 | A1 * | 5/2006 | Delaney | B41J 13/12 235/449 |
| 2006/0288532 | A1 * | 12/2006 | Kim | E05D 7/1077 16/267 |
| 2018/0202208 | A1 * | 7/2018 | Siek | E05D 3/022 |
| 2019/0135569 | A1 | 5/2019 | Marshall et al. | |
| 2021/0208639 | A1 * | 7/2021 | Sanchez | E05D 11/08 |

OTHER PUBLICATIONS

"European Application Serial No. 24173945.7, Extended European Search Report mailed Sep. 9, 2024", 6 pages.
"Evolis Zenius Brochure", [Online]. Retrieved from the Internet: URL: https: www.idcardgroup.com media files Evolis%20Zenius%20Brochure.pdf, (Dec. 31, 2015), 2 pages.
"Evolis Zenius Quick Start Guide", Id Card Group, [Online]. Retrieved from the Internet: URL: https: www.youtube.com watch?v=iYvUvscR7aMandt=82s, (Dec. 29, 2017), 2 pages.

* cited by examiner

TILTING DOOR SYSTEM WITH A DAMPING SYSTEM

CROSS-REFERENCE TO RELATED APPLICATION(S)

This application claims priority to French Patent Appl. No. FR2304507, filed May 5, 2023, which is incorporated herein by reference in its entirety.

TECHNICAL FIELD

The present invention relates to a door system for a processing machine, comprising a tilting door and a system for damping the door in the open position, as well as a processing machine including such a door system.

PRIOR ART

There are processing machines that are intended to process plastic cards, like bank cards. For example, such a processing machine includes a printer, which prints a pattern on the card, or an encoding machine, which encodes a chip on the card. For this purpose, the processing machine is equipped with a processing module which acts on the card. To process such cards on a large scale, it is known to use a card feeder upstream of the processing module.

In general, such a card feeder includes a reservoir where the cards are stacked on top of one another and a separation system which takes the cards one after another by separating them. The reservoir is closed by a door which can be moved from an open position in which it enables free access to the reservoir and a closed position in which it prevents access to the reservoir.

For example, there are tilting doors which have a horizontal axis of rotation and which open by rotation between the closed position corresponding to a vertical position and the open position corresponding to a horizontal position.

Upon tilting from the closed position to the open position, the door falls under the effect of gravity and it lies against a fixed stop which blocks it in the open position. When arriving at this stop, the door bounces several times before stabilizing.

DISCLOSURE OF THE INVENTION

An object of the present invention is to provide a door system for a processing machine, comprising a door system equipped with a damping system which prevents the door from bouncing upon opening thereof.

To this end, a door system for a processing machine is proposed, said door system including:

- a secondary frame having at least one stop,
- a door having a leaf and a shaft secured to the leaf, where the shaft is mounted movable in rotation about a tilting axis on the secondary frame between a closed position where the leaf extends vertically and an open position where the leaf extends horizontally and where, in the closed position, the shaft is in the lower portion of the leaf, where the shaft has on its periphery and for at least one stop, a projection or protrusion, where, in the closed position, the protrusion is not pressed against said stop and where, in the open position, the protrusion is pressed against said stop.

Advantageously, the shaft includes an inclined plane which connects the circular periphery of the shaft and the top of the protrusion.

Advantageously, there is a protrusion at each end of the shaft and one stop for each protrusion.

Advantageously, the door system includes, secured to the secondary frame, two first pairs of two jaws aligned vertically and open towards a first direction, and two second pairs of two jaws aligned vertically and open towards a second direction opposite to the first direction to delimit, between the pairs, a channel in which the shaft is inserted, and the/each stop consists of a jaw. Advantageously, in the closed position, the protrusion is positioned at an opening between two jaws.

The invention also proposes a card processing machine including a door system according to one of the preceding variants.

BRIEF DESCRIPTION OF THE DRAWINGS

The above-mentioned features of the invention, as well as others, will appear more clearly upon reading the following description of an example embodiment, said description being made with reference to the appended drawings, wherein.

DETAILED DISCLOSURE OF EMBODIMENTS

Figure 1:
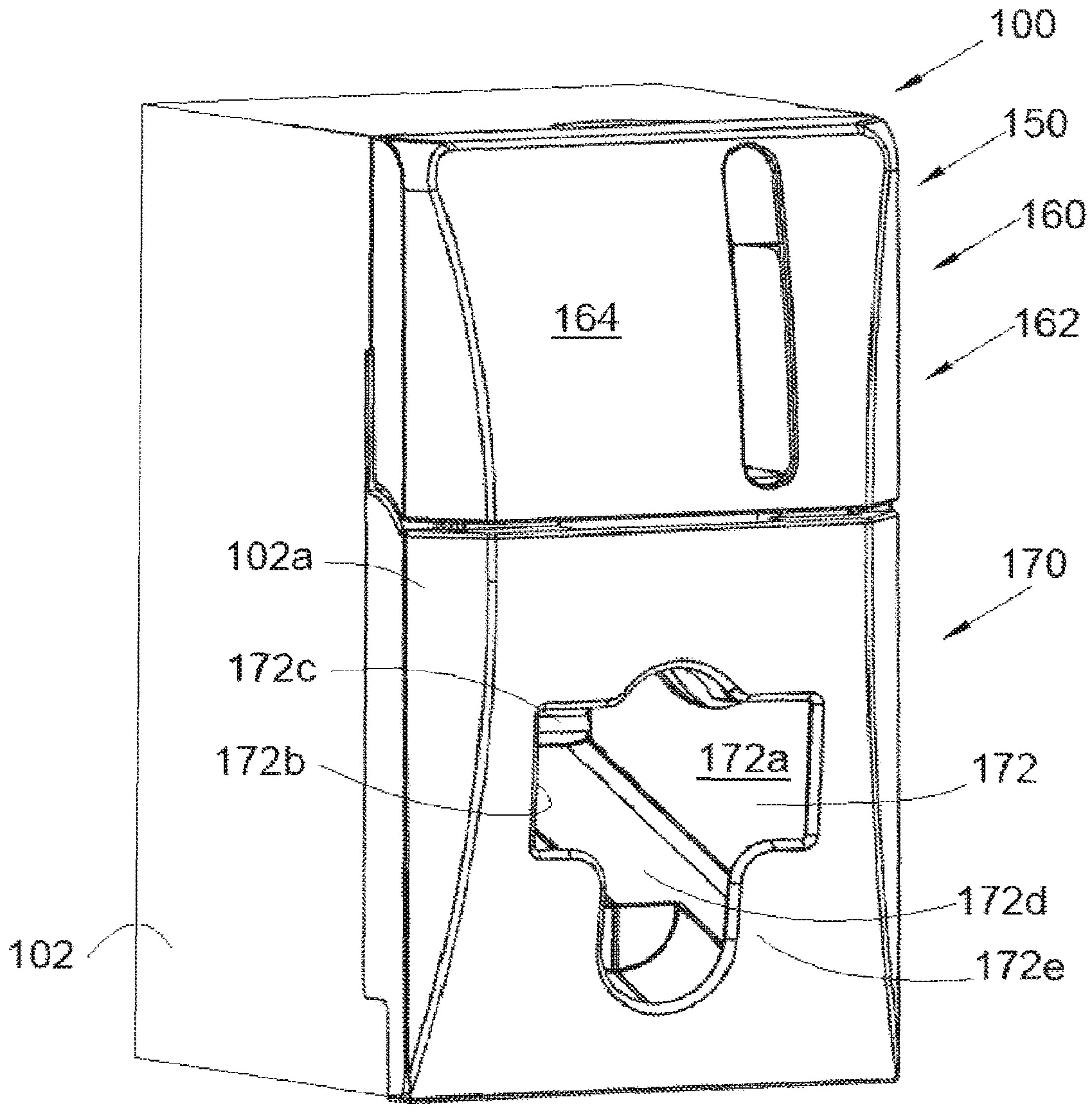
FIG. 1 is a perspective view of a processing machine with a door system according to the invention where the door is in the closed position.
Figure 2:
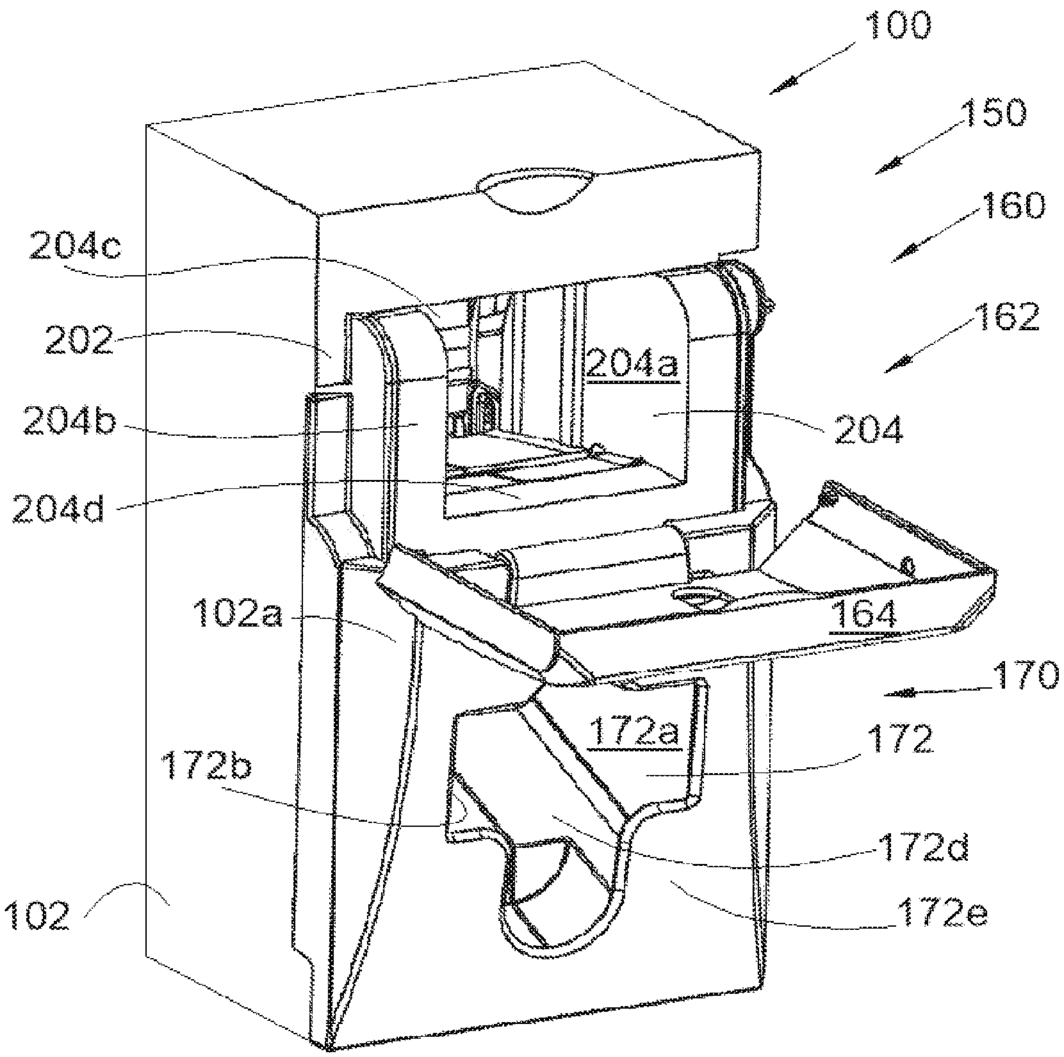
FIG. 2 is a perspective view of the processing machine of FIG. 1 with the door in the open position.

In the following description, the terms relating to a position are considered with reference to a processing machine 100 in the use position, i.e., as it is illustrated in FIG. 1 and FIG. 2.

The processing machine 100 includes a frame 102, a card feeder 150 and a card receptacle 170.

Conventionally, the processing machine 100 also includes a processing module and a transport system which includes means for moving the cards from the card feeder 150 to the processing module, then to the card receptacle 170, where the means conventionally include rolls which pinch the cards and motors which drive the rolls in rotation. Thus, the processing module is downstream of the card feeder 150 with respect to the direction of movement of the cards by the transport system and upstream of the card receptacle 170. In the embodiment of the invention depicted in FIGS. 1 and 2, the card receptacle 170 is arranged below the card feeder 150, but it may be arranged in another location.

In the embodiment of the invention depicted in FIG. 2, the card feeder 150 is secured to the frame 102 and it includes a reservoir 204 in which the cards to be processed are stored. The reservoir 204 is herein delimited by three vertical walls 204*a-c*, namely a back wall 204*c* and two lateral walls 204*a-b* arranged on either side of the back wall 204*c*. These vertical walls 204*a-c* are secured to the frame 102 and form, when seen from above, a U, where the lateral walls 204*a-b* form the branches of the U and where the back wall 204*c* forms the bottom of the U.

In the lower portion, the reservoir 204 has a plate 204*d* secured to the frame 102 and generally horizontal which forms the base of the reservoir 204 and above which the cards to be processed, such as plastic cards, are stored. Thus, the cards are stacked on top of one another and on the plate 204*d*. Thus, the cards are arranged between the vertical walls 204*a-c* and on the plate 204*d*.

The card feeder 150 herein has a door system 160 according to the invention.

In the embodiment of the invention depicted in FIGS. 1 and 2, the card receptacle 170 is secured to the frame 102 and it includes a housing 172 in which the processed cards are stored. Like for the reservoir 204, the housing 172 is herein delimited by three vertical walls 172*a-c*, namely a back wall 172*c* and two lateral walls 172*a-b* arranged on either side of the back wall 172*c*. These vertical walls 172*a-c* are secured to the frame 102 and form, when seen from above, a U, where the lateral walls 172*a-b* form the branches of the U and where the back wall 172*c* forms the bottom of the U.

In the lower portion, the housing 172 has a plate 172*d* secured to the frame 102 and generally horizontal which forms the base of the housing 172 and above which the processed cards are stored. Thus, the cards are stacked on top of one another and on the plate 172*d*. Thus, the cards are arranged between the vertical walls 172*a-c* and on the plate 172*d*.

In this case, the card receptacle 170 has a front wall 172*e* which is also vertical and which closes, at least partly, the housing 172 so as to stop the cards which fall into the housing 172.

The processing module is, for example, a printer or an encoding module, etc. The processing module and the transport system will not be described in more detail because they can take on any form known to a person skilled in the art. Similarly, the card feeder 150 and the card receptacle 170 may take on other forms.

Although the door system 160 is more particularly described as associated with the card feeder 150, a similar door system can be implemented for the card receptacle 170.

Figure 3:
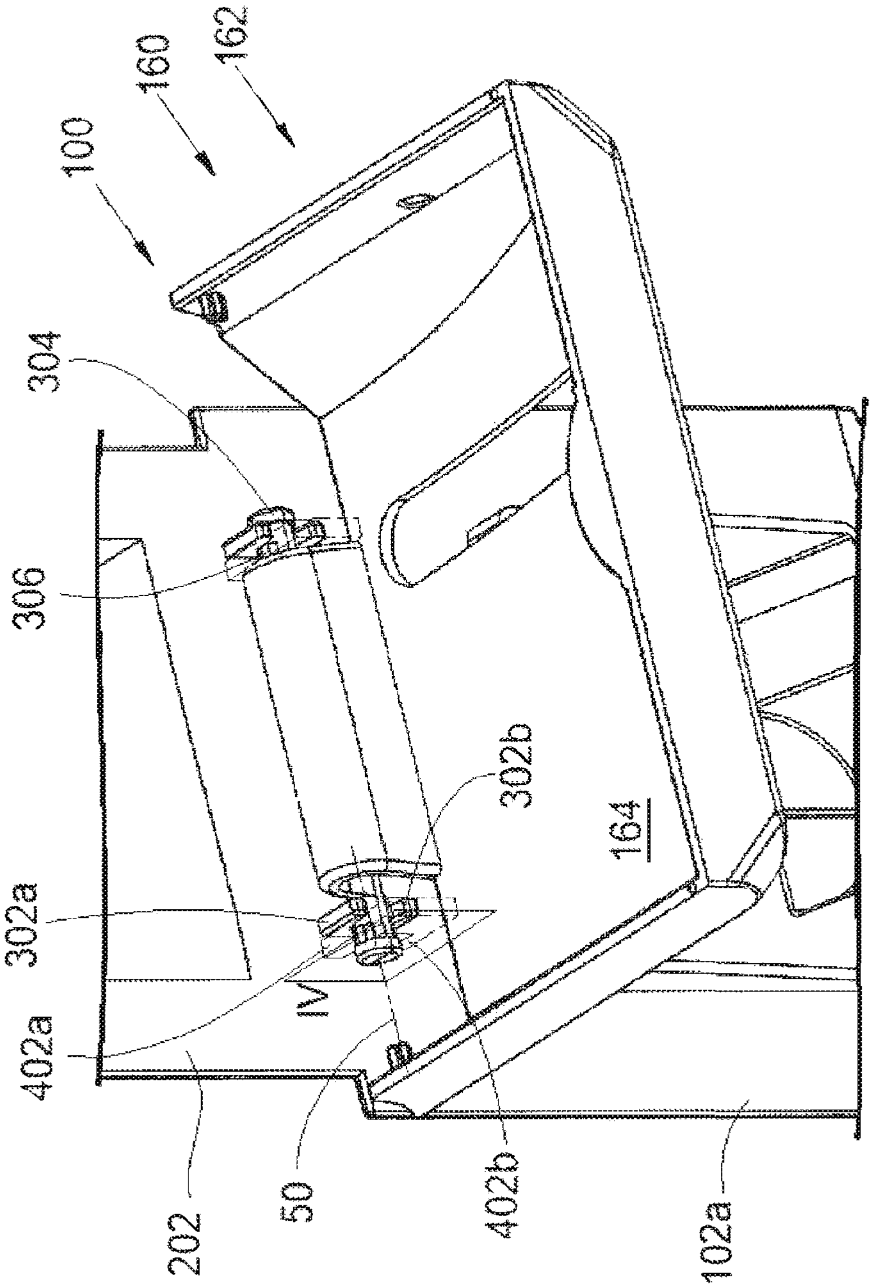
FIG. 3 is a perspective view of a detail of implementation of the door system according to the invention.
Figure 4:
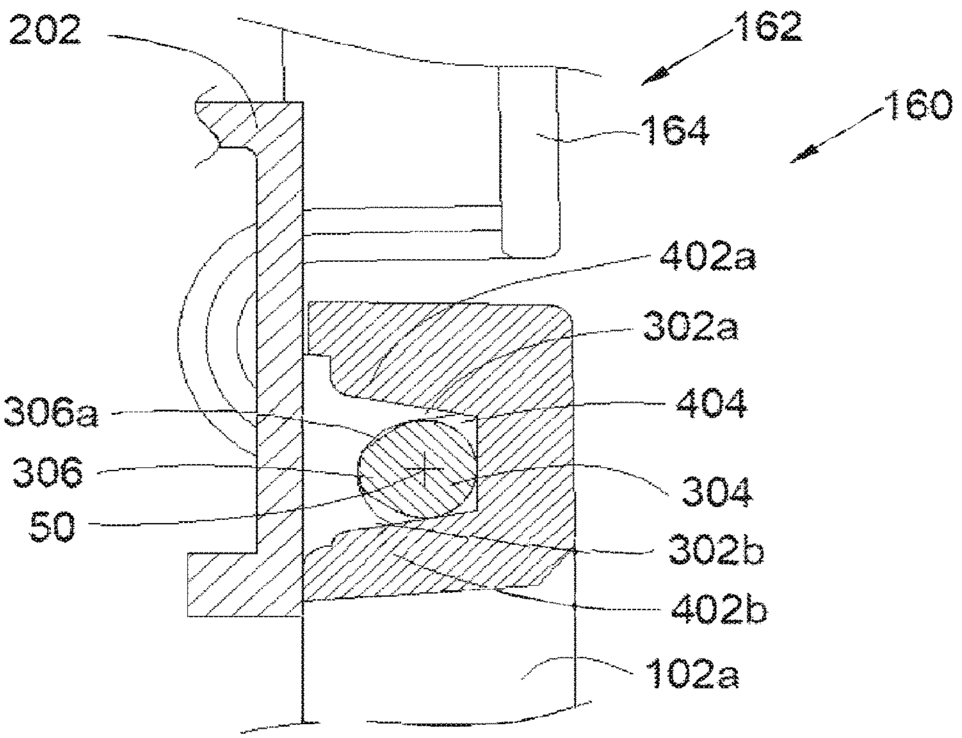
FIG. 4 is a sectional view according to the plane IV of FIG. 3 with the door in the closed position.
Figure 5:
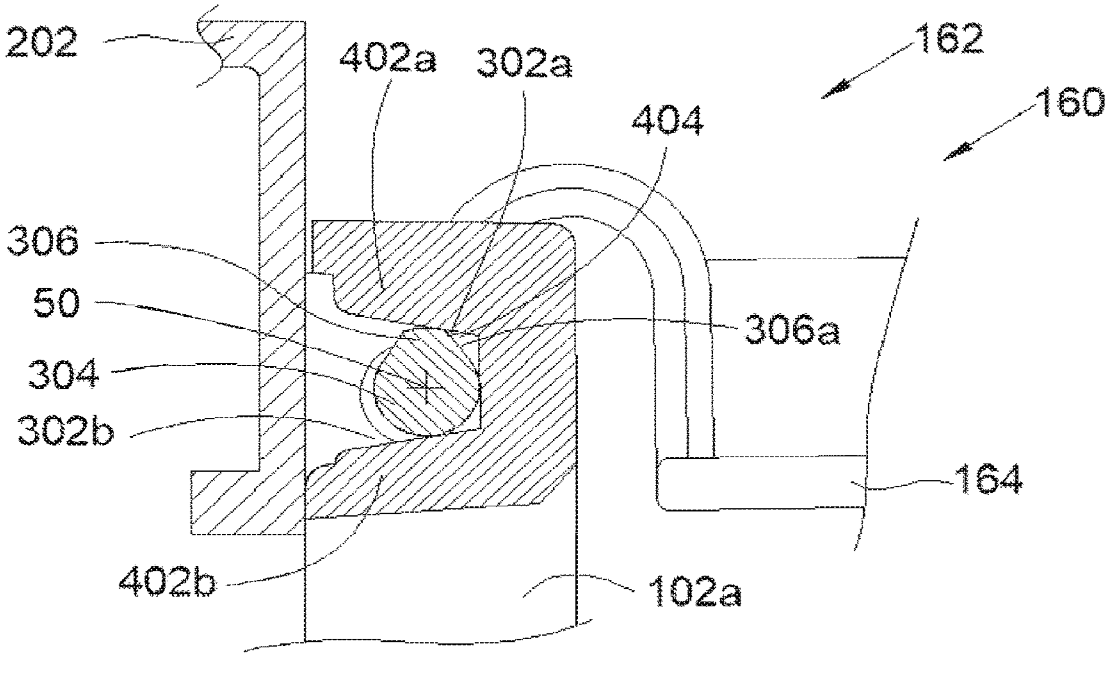
FIG. 5 is a view similar to that of FIG. 4 in the open position.

The door system 160 includes a door 162 having a leaf 164 movable alternately between a closed position (FIGS. 1 and 4) and an open position (FIGS. 2, 3, and 5). In the closed position, the leaf 164 forms a front wall of the reservoir 204 and closes it to hold the cards to be processed.

FIG. 3 shows the leaf 164 in the open position, and FIGS. 4 and 5 show sections at the hinge of the leaf 164 respectively in the closed position and in the open position.

The door system 160 includes a secondary frame 202 which includes at least one stop 302*a-b*, 402*a-b*. The secondary frame 202 is secured to the frame 102 of the processing machine 100, and it may be a portion of the frame 102 of the processing machine 100 or an attached and fastened element.

The door 162 also includes a shaft 304 secured to the leaf 164, herein via a swan neck. The shaft 304 is mounted movable in rotation about a tilting axis 50 on the secondary frame 202 to enable the rotation of the shaft 304, and therefore of the leaf 164, about the tilting axis 50 between the closed position where the leaf 164 extends vertically and the open position where the leaf 164 extends horizontally.

In the closed position, the shaft 304 is in the lower portion of the leaf 164 to enable opening of the leaf 164 by gravity.

The shaft 304 has on its periphery, and for at least one stop 302*a-b*, 402*a-b* (herein the stop or stops 402*a-b*), a projection or protrusion 306 which therefore projects from the shaft 304.

As shown in FIG. 4, the protrusion 306 is positioned so that in the closed position, there is therefore no contact between the protrusion 306 and the stop 402*a-b*, and the protrusion 306 is therefore not pressed against the stop 402*a-b* and no blocking force is exerted by the stop 402*a-b* on the protrusion 306.

As shown in FIG. 5, after tilting the door 162, the protrusion 306 is positioned so that, in the open position, there is contact between the protrusion 306 and the stop 402*a-b* and the protrusion 306 is therefore pressed against the stop 402*a-b*, and blocking forces are exerted by the stop 402*a-b* on the protrusion 306 to block it in rotation.

Thus, with such an arrangement, when the door 162 tilts towards the open position, the protrusion 306 rubs against the stop 402*a-b* which blocks movement thereof and any possible bouncing.

In the embodiment of the invention presented herein, the protrusion 306 cooperates with the stop 402*a* which is above the shaft 304, but with a different arrangement, the protrusion 306 will cooperate with a stop 402*b* which is below the shaft 304.

Conventionally, the closed position of the door 162 may be guaranteed by a blocking means, such as a clip secured to the leaf 164 and including a flexible tooth which is inserted into a recess of the secondary frame 202 provided for this purpose.

On the side of the stop 402*a*, the shaft 304 herein includes an inclined plane 306*a* which connects the circular periphery of the shaft 304 and the top of the protrusion 306 so as to form a corner which is inserted between the shaft 304 and the stop 402*a*.

In the embodiment of the invention depicted in FIG. 3, there is a protrusion 306 at each end of the shaft 304 to ensure symmetrical blocking and there is thus one stop 402*a* for each protrusion 306.

Various arrangements are possible to carry out the rotation of the shaft 304 on the secondary frame 202, such as, for example, a hinge where the protrusion is then arranged on a movable node of the hinge.

In the embodiment of the invention depicted in FIGS. 3, 4, and 5, the door system 160 includes four pairs of two jaws 302*a-b*, 402*a-b*. In the embodiment of the invention, there are two first pairs of two jaws 302*a-b*, where each first pair is open towards a first direction herein corresponding to the outside of the processing machine 100, and two second pairs of two jaws 402*a-b* (shown in ghost lines in FIG. 3) where each second pair is open towards a second direction opposite to the first direction, i.e., in this case the inside of the processing machine 100.

The first pairs are secured to a first element of the processing machine 100, herein to the secondary frame 202, and the second pairs are secured to a second element of the processing machine 100, herein to a cover 102*a* which is fastened to the secondary frame 202 and which herein forms the front wall 172*e* of the card receptacle 170.

The jaws 302*a-b*, 402*a-b* are aligned along the tilting axis 50 which forms the hinge axis of the leaf 164.

The two jaws 302*a-b* of a first pair are herein arranged next to the two jaws 402*a-b* of a second pair.

The opposite orientation between the jaws 302*a-b* of the first pairs and the jaws 402*a-b* of the second pairs allows delimiting a channel 404 therebetween which extends along the tilting axis 50 and in which the shaft 304 is inserted to rotate about the tilting axis 50. The dual arrangement of two pairs of jaws 302*a-b*, 402*a-b* facing one another allows holding the shaft 304 in the channel 404. For each pair of two jaws 302*a-b*, 402*a-b*, there is a jaw 302*a*, 402*a* above the shaft 304 and a jaw 302*b*, 402*b* below the shaft 304 and aligned vertically with said jaw 302*a*, 402*a*.

The stop herein comprises one/each jaw 402*a* of a second pair, but it may comprise one/each jaw 302*a* of a first pair.

As shown in FIG. 4, in the closed position, the protrusion 306 is herein positioned at the opening between two jaws 402*a-b*. Hence, there is no contact between the protrusion 306 and a jaw 402*a-b*.

As shown in FIG. 5, in the open position, the protrusion 306 is positioned against a jaw 402*a*. Hence, there is contact between the protrusion 306 and the jaw 402*a*.

The door 162 is mounted movable in rotation on the secondary frame 202, between an open position, enabling access to the inside of the reservoir 204 and the deposition of cards on the plate 204*d*, and a closed position, preventing access to the reservoir 204 while enclosing the cards in the reservoir 204, and vice versa. Thus, the door 164 closes the U formed by the vertical walls 204*a-c*.

The door 162 is movable in rotation about a tilting axis 50 which is directed horizontally. Thus, the door 162 can tilt about the tilting axis 50 between the open position and the closed position, and vice versa. In the open position, the door 162 is directed generally vertically and, in the open position, the door 162 is directed generally horizontally.

The tilting axis 50 is in the lower portion of the door 162 when it is in the closed position. Thus, when the door 162 is maneuvered to the open position, it tilts under the effect of gravity.

The invention claimed is:

1. A door system for a processing machine, the door system comprising:

a secondary frame having a first stop and a second stop; and a door having a leaf and a shaft secured to the leaf, wherein the shaft is mounted movable in rotation about a tilting axis on the secondary frame between a closed position wherein the leaf extends vertically and an open position wherein the leaf extends horizontally, and wherein, in the closed position, the shaft is in the lower portion of the leaf;

wherein a first end of the shaft has, on its periphery, a first protrusion, wherein, in the closed position, the first protrusion is not pressed against the first stop and wherein, in the open position, the first protrusion is pressed against the first stop; and wherein a second end of the shaft has, on its periphery, a second protrusion wherein, in the closed position, the second protrusion is not pressed against the second stop and wherein, in the open position, the second protrusion is pressed against the second stop.

2. The door system according to claim 1, wherein the shaft includes an inclined plane which connects a circular periphery of the shaft and a top of the first protrusion.

3. The door system according to claim 1, further comprising, secured to the secondary frame, two first pairs of two first jaws, the first jaws of each respective first pair aligned vertically and open towards a first direction, and two second pairs of two second jaws, the second jaws of each respective second pair aligned vertically and open towards a second direction opposite to the first direction, to delimit between the first and second pairs, a channel in which the shaft is inserted;

wherein the first stop comprises at least one of the first or second jaws.

4. The door system according to claim 3, wherein, in the closed position, the first protrusion is positioned at an opening between at least one of: the first jaws of at least one of the first pairs of jaws, or the second jaws of at least one of the second pairs of jaws.

5. The door system according to claim 3, wherein each of the first stop and the second stop comprises at least one of the first or second jaws.

6. The door system according to claim 5, wherein, in the closed position, each of the first protrusion and the second protrusion is positioned at a respective opening between at least one of: the first jaws of at least one of the first pairs of jaws, or the second jaws of at least one of the second pairs of jaws.

7. A card processing machine comprising a door system according to claim 1.

8. A card processing machine comprising a door system according to claim 4.

* * * * *